Aug. 5, 1958  C. A. EDLUND ET AL  2,846,058
THERMOMETER DISPENSER
Filed Aug. 19, 1955
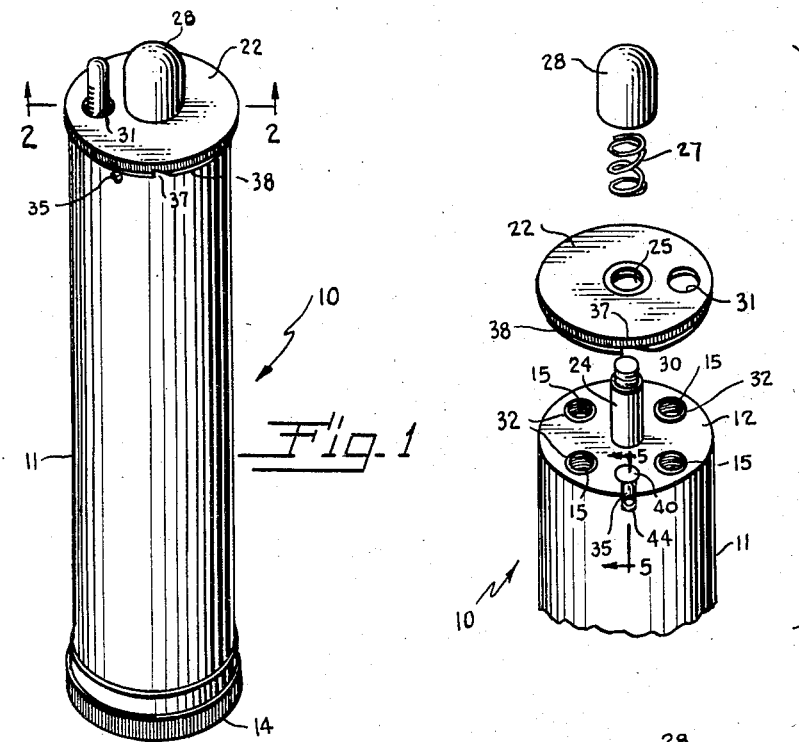
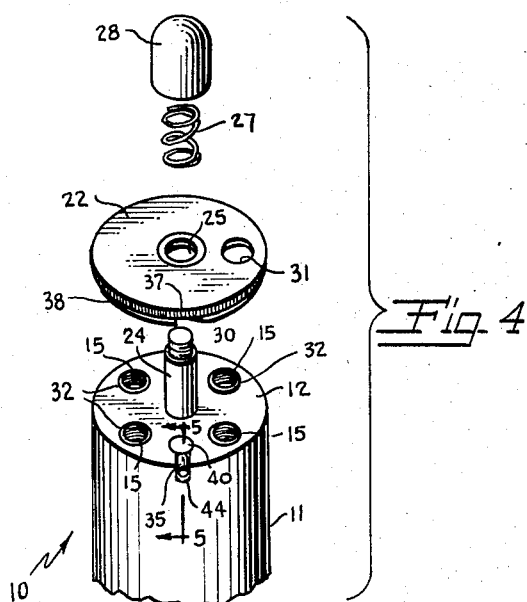
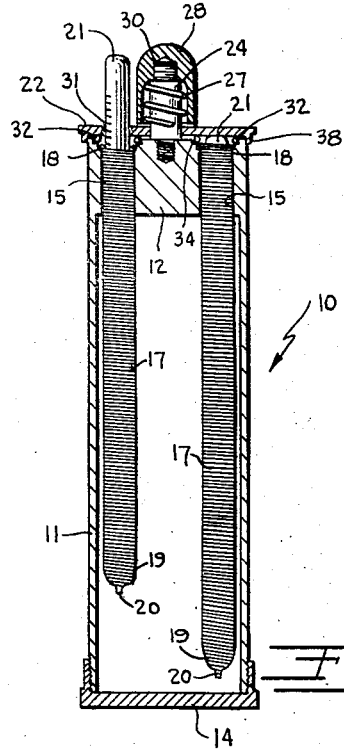
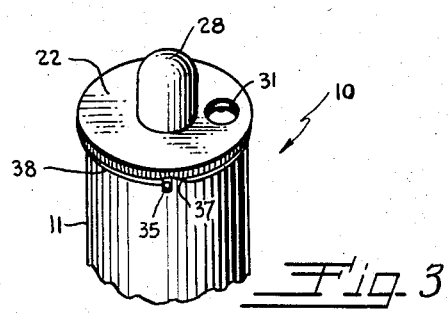
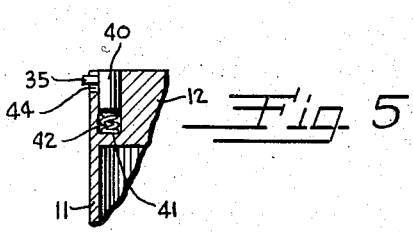
INVENTORS
CARL A. EDLUND
JOHN L. MAND, Jr.
BY LAWERENCE J. SCHEER
Richard von K. Bruns
Attorney United States Patent Office 2,846,058
Patented Aug. 5, 1958

2,846,058
THERMOMETER DISPENSER

Carl A. Edlund, Syracuse, John L. Mand, Jr., De Witt, and Lawrence J. Scheer, Syracuse, N. Y.

Application August 19, 1955, Serial No. 529,402

5 Claims. (Cl. 206—16.6)

This invention relates to carrying cases for clinical or medical thermometers, and has particular reference to an improved construction for a combination carrying case and dispenser which is adapted to resiliently support a plurality of thermometers in a sterilizing or germicidal solution.

Briefly stated, the invention contemplates the provision of a durable, leak-proof case in which four or more thermometers are resiliently supported in such a manner that they are completely immersed in a germicidal solution contained within the case. The support member for each thermometer is a basket spring which is placed under tension when the thermometer is completely enclosed within the case, and as the top opening in communication with each spring is uncovered, the spring contracts to gently eject the thermometer so that it may be easily grasped and removed from the solution. Means are provided so that after one thermometer has been used and returned to the case, it cannot be again used until each of the other thermometers has been used, thus insuring that thorough sterilization will take place. The case may be adapted for use with either oral or rectal thermometers, and each case is provided with easily discernable means to indicate which type of thermometer is contained therein. The case or container is of compact, light-weight construction so that it can be conveniently carried in a physician's bag or in a pocket of his clothing, and it is made of corrosion resistant parts which can be quickly disassembled to facilitate cleaning.

Accordingly, with the foregoing and other considerations in view, it is the primary object of the present invention to provide an improved thermometer carrying case which is adapted to resiliently support a plurality of thermometers in a completely immersed state in the germicidal solution.

Another important object of the invention is to provide a combination thermometer carrying case and dispenser wherein the thermometer selected for use is automatically, yet gently, ejected from the case to facilitate withdrawal of the thermometer from the germicidal solution.

A further important object of the invention is to provide a thermometer carrying case and dispenser wherein the thermometers in the case must be used in sequence to insure thorough sterilization of each one between uses.

A still further important object of the invention is to provide a thermometer carrying case and dispenser which is strong and durable and yet is of relatively simple, inexpensive construction.

A more specific object of the invention is to provide a thermometer carrying case and dispenser wherein each thermometer in the case is resiliently supported by means of a basket spring which also serves to eject the thermometer when it is selected for use.

Another specific object of the invention is to provide a thermometer carrying case and dispenser having a rotatable top closure plate having means therein to permit selective dispensing of but one thermometer at a time.

A further specific object of the invention is to provide a thermometer carrying case and dispenser which may be adapted for use with either oral or rectal thermometers and is provided with color code means to indicate which type of thermometer is contained in the case.

Other objects and advantages of the invention will become apparent from the following detailed description thereof read in conjunction with the accompanying drawings which illustrate a preferred embodiment of the invention for the purpose of disclosure.

In the drawings:

Figure 1 is a perspective view of the thermometer carrying case and dispenser embodying the invention;

Figure 2 is a vertical section taken alone line 2—2 of Figure 1;

Figure 3 is a perspective view of the upper portion of the thermometer case showing the top closure plate in one of its alternative positions wherein the thermometers are sealed within the case;

Figure 4 is an exploded perspective view corresponding to Figure 3;

Figure 5 is a vertical section taken along the line 5—5 of Figure 4 showing the details of the top closure detent.

Having reference now to the drawings, wherein like reference numbers designate the same part in all the views, 10 generally indicates the thermometer carrying case and dispenser which is preferably in the form of a hollow cylindrical container of some material such as anodized aluminum which is both corrosion resistant and light in weight. As best shown in Figure 2, the tubular side wall 11 of the container is relatively thin while the top wall 12, which is formed integrally with the side wall, is substantially thicker. The container is open at the bottom to permit it to be inverted and filled with a sterilizing or germicidal solution, and this opening is normally covered with a cap or closure member 14 which threadedly engages the side wall, the cap being provided with a sealing gasket (not shown) of any suitable type to prevent leakage of the solution.

In the illustrated embodiment of the invention, the top wall 12 of the container is formed with four uniformly spaced bores 15 arranged concentrically with respect to the center of the wall. The upper end of an elongated basket spring 17 of some corrosion resistant material, such as stainless steel, is mounted in each one of these bores, the bores being formed with small counterbores or shoulders 18 against which the top one or two turns of the springs bear to hold the springs in position. Springs 17 extend downwardly into the interior of the container and solution contained therein and terminate in closed ends as indicated at 19. The term "basket spring" as used herein is intended to mean a spring having such a closed end, the ends of the springs in the present instance being closed by gradually decreasing the diameters of the last few turns of the spring and positioning a small plug 20 in the end turn which is of minimum diameter.

The basket springs 17 support the thermometers in the germicidal solution in the container, the thermometers being inserted into the container through the bores 15 and being received in the interior of the springs or within the windings thereof. The diameters of the bores and springs will depend upon whether the case is to be used for oral or rectal thermometers, but in either case there will be sufficient clearance between the support members and thermometers to enable the latter to be easily inserted into or withdrawn from the case, and also to insure overall contact of the thermometers by the solution. The basket springs 17 in contracted or relaxed condition are shorter in length than the thermometers with which the case is used so that when a thermometer 21 is initially positioned within a spring, it will project above the bore 15 corresponding thereto, as shown at the left side of Figure 2. This means that the spring must be expanded or placed under tension when a thermometer is thrust down into the container so that it is completely enclosed thereby, as shown at the right side of Figure 2.

The thermometers are retained in the container against the spring tension by means of a circular plate or disc 22 which overlies the top wall 12 of the container and normally covers the bores 15. An upstanding post 24 is centrally mounted on the top wall 12 by any suitable means, and this post passes with a free fit through a central bore 25 in the disc 22 so that the latter can rotate freely on the post, the disc being knurled at its peripheral edge to facilitate manual rotation thereof. A coil spring 27 mounted on the post 24 bears against the disc to hold it down against the top wall, and also serves to hold it in any rotated position to which it is moved. Spring 27 is retained on the post by means of a top cap 28 which is threaded onto a reduced threaded extension 30 of the post and may be adjusted to regulate the spring compression.

In order to enable the thermometers to be inserted into or withdrawn from the container, the disc 22 is provided with a single aperture 31 having a diameter that is substantially equal to the diameters of bores 15 and located so that it successively registers with each of the bores as the disc is rotated. The aperture 31 thus permits insertion or withdrawal of one thermometer at a time, or it can be positioned so that it is out of registry with any of the bores so that the container is completely sealed. In order to prevent any leakage of the solution between the container top wall and disc in the latter case, an O-ring 32 of synthetic rubber or the like is positioned in a shallow counterbore 34 at the upper edge of each bore 15. These rings project slightly above the surface of the top wall so that the disc, under the action of the spring 27, bears thereagainst to effect a liquid tight seal.

To insure thorough sterilization of the thermometers between each use thereof, it is desirable to employ the thermometers in sequence so that after one has been used and returned to the case it will not be used again until all the others have been used. To this end, means are provided which permit the disc 22 to be rotated in one direction only, the means comprising a spring biased detent 35 projecting radially outwardly from the container wall adjacent the upper edge thereof and a plurality of ratchet type notches 37 formed in a depending flange 38 on the disc. Detent 35 is mounted on a small plunger 40 which is slidably mounted in a bore 41 in the container top wall 12, a compression spring 42 being positioned between the plunger and bottom of the bore. The detent projects outwardly through a slot 44 in the top wall which is elongated to permit vertical movement of the detent. With this arrangement, the detent is forced down in the slot 44 by the unnotched portion of the flange 38 but springs up into the notches 37 as they are rotated into alignment therewith. In the illustrated embodiment, the left side of each notch is vertical and forms a stop while the right side thereof is inclined so that the disc can be rotated in a clockwise direction only. As best shown in Figures 3 and 4, the notches 37 are so located with respect to the aperture 31 that the detent will engage in one of the notches whenever the aperture is in one of the four positions wherein it is out of registry with any of the bores 15, the container being completely sealed in such instance.

Since the case is adapted for use with either oral or rectal thermometers, provision is made so that it can be quickly determined which type of thermometer is in a particular case. Thus, the top cap 28 will be anodized in either of two colors, as for example, red for oral and blue for rectal thermometers. It should also be pointed out that the top cap can be easily removed to permit disassembly of the spring 27, disc 22, etc., for cleaning purposes.

In operation, the thermometer case is filled from the bottom with a germicidal solution, the disc 22 being positioned with its aperture 31 out of registry with any of the bores 15 so that the top of the case is sealed. The thermometers are then inserted into the case one by one, placing the basket springs 17 under tension, and the disc 22 is again moved to closed or sealing position until a thermometer is needed. At such time, the disc is turned clockwise ⅛ revolution from sealing position which will bring it approximately into registry with one of the bores 15. Uncovering the bore permits the basket spring corresponding thereto to contract and gently raise the upper portion of the thermometer supported thereby above the disc so that it can be easily grasped and removed without having to tip the case. After the thermometer has been used, it is returned to the case and thrust downwardly in its supporting spring until it is below the disc which is then rotated clockwise ⅛ revolution to again close off all the bores. Since it is not possible to rotate the disc in the counter-clockwise direction, the physician cannot mistakenly use the same thermometer the next time one is needed but must use the next adjacent thermometer in the clockwise direction, again turning the disc clockwise ⅛ revolution to uncover the bore and permit automatic ejection of same.

From the foregoing description it will be apparent that the present invention provides a novel and highly useful thermometer carrying case and dispenser which enables a number of thermometers to be safely transported or stored, and insures thorough sterilization of the thermometers after each use. The embodiment of the invention disclosed herein is simple in operation and construction, and at the same time is extremely strong and durable. The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. A sterile thermometer dispenser comprising a tubular container adapted to be filled with a germicidal solution, said container having a relatively thick top wall formed integrally therewith and an open bottom through which the container is filled, a removable liquid-tight cap normally secured to said container to close the bottom opening, said top wall having a plurality of uniformly spaced bores therethrough concentrically arranged with respect to the center of the wall, a disc member rotatably mounted on said top wall normally covering said bores, said disc having a single aperture therethrough selectively movable into registry with each of said bores upon rotation of the disc, coacting means in said disc and top wall to permit rotation of the disc in one direction only, sealing means adjacent the upper edge of each bore and engaging said disc to prevent leakage of the solution through the bores when the disc aperture is out of registry therewith, spring means mounted on said container above said disc member to urge the latter into close engagement with said sealing means, and a plurality of elongated basket springs corresponding to said bores, each of said springs being secured at its upper end within one of the bores and extending downwardly into the solution in the container to resiliently support a thermometer within its windings so that the latter is completely immersed in the solution, said springs in contracted condition being shorter in length than the thermometers and being expanded thereby when the thermometers are fully inserted in the container and maintained therein by the disc when the aperture in the latter is out of registry with all of said bores, each of said springs contracting to project a portion of its thermometer above said disc so that it may be easily grasped when the disc is rotated to move its aperture into registry with the bore corresponding to the spring.

2. A device as defined in claim 1 wherein said disc member includes a downwardly extending flange encircling the upper edge of said top wall, and said coacting means in said disc and top wall includes a plurality of ratchet notches in said flange and a spring biased detent in the top wall coacting with said notches.

3. A device as defined in claim 1 wherein each of said bores is formed with a shallow counter bore at the upper edge thereof and said sealing means are a plurality of O-rings respectively positioned in each counterbore.

4. A sterile thermometer dispenser comprising a container having a fixed top wall and a removable bottom member, said top wall having a plurality of apertures therethrough, a plate member rotatably mounted on said container overlying said top wall and normally covering said apertures, spring means mounted on said container above said plate member to urge it into close engagement with said top wall, said plate member having a single aperture therein selectively movable into registry with each of said top wall apertures upon rotation of the plate member, coacting means in said plate member and top wall to permit rotation of the plate member in one direction only, and an elongated basket spring depending from each of said top wall apertures and extending downwardly into said container to support a thermometer within its windings, each of said springs in contracted condition being shorter in length than the thermometer so that it is placed under tension when the thermometer is thrust down into the container and maintained therein by said plate member when the aperture in the latter is moved out of registry with the top wall apertures, said spring contracting to elevate a portion of the thermometer above said plate member when the aperture therein is moved into registry with the top wall aperture corresponding to the spring.

5. A sterile thermometer dispenser comprising a tubular container adapted to be filled with a germicidal solution, said container having an integrally formed top wall and a removable bottom member, said top wall having at least one aperture therethrough, and a plate member mounted on said container for rotational movement relative thereto, means to prevent rotation of said plate member in more than one direction, spring means mounted on said container above said plate member to urge the latter into close engagement with said top wall, said plate member normally covering said top wall aperture but having a corresponding aperture movable into registry therewith to permit access thereto, and an elongated basket spring mounted at its upper end in said top wall aperture and extending downwardly into the germicidal solution in the container, said spring being adapted to receive within its interior a thermometer inserted into the container through said aperture so that the thermometer is resiliently supported in the solution, said spring being normally shorter than the thermometer so that it is expanded thereby when the thermometer is fully positioned within the container and maintained therein by moving said plate member aperture out of registry with said top wall aperture to close off the latter.

References Cited in the file of this patent

UNITED STATES PATENTS

| | | |
|---|---|---|
| 28,037 | Harold | Apr. 24, 1860 |
| 860,088 | Hart | July 16, 1907 |
| 897,075 | Edwards | Aug. 25, 1908 |
| 1,516,689 | Rook | Nov. 25, 1924 |
| 2,199,242 | Ladd | Apr. 30, 1940 |
| 2,351,815 | Jensen | June 20, 1944 |
| 2,557,222 | Goode | June 19, 1951 |
| 2,573,311 | Cupler | Oct. 30, 1951 |

FOREIGN PATENTS

| | | |
|---|---|---|
| 6,226 | Great Britain | Mar. 20, 1908 |